(12) United States Patent
Chang et al.

(10) Patent No.: US 8,704,991 B2
(45) Date of Patent: Apr. 22, 2014

(54) LIQUID CRYSTAL DISPLAY DEVICE CAPABLE OF COMPENSATNG FOR A RESISTANCE VARIATION IN A LINK UNIT

(75) Inventors: Sung Soo Chang, Gyeonggi-do (KR); Hyung Beom Shin, Daegu-si (KR); Sang Wook Park, Jeju-do (KR)

(73) Assignee: LG Display Co., Ltd., Seoul (KR)

( * ) Notice: Subject to any disclaimer, the term of this patent is extended or adjusted under 35 U.S.C. 154(b) by 539 days.

(21) Appl. No.: 11/444,152

(22) Filed: May 30, 2006

(65) Prior Publication Data
US 2006/0267914 A1  Nov. 30, 2006

(30) Foreign Application Priority Data
May 31, 2005  (KR) .................. 10-2005-0045916

(51) Int. Cl.
*G02F 1/1333* (2006.01)
*G02F 1/1343* (2006.01)
*G02F 1/1345* (2006.01)

(52) U.S. Cl.
USPC ........... 349/149; 349/138; 349/150; 349/151; 349/152

(58) Field of Classification Search
USPC ................................ 349/148–152, 138–139
See application file for complete search history.

(56) References Cited

U.S. PATENT DOCUMENTS

| | | | | |
|---|---|---|---|---|
| 5,781,253 A | * | 7/1998 | Koike et al. | 349/40 |
| 6,104,465 A | | 8/2000 | Na et al. | |
| 6,317,174 B1 | * | 11/2001 | Noumi et al. | 349/42 |
| 6,483,565 B1 | * | 11/2002 | Hidehira et al. | 349/141 |
| 2003/0122989 A1 | * | 7/2003 | Park et al. | 349/43 |
| 2004/0126942 A1 | | 7/2004 | Park et al. | |
| 2004/0218108 A1 | * | 11/2004 | Ko et al. | 349/40 |

FOREIGN PATENT DOCUMENTS

| | | | |
|---|---|---|---|
| JP | 2001-125122 | | 5/2001 |
| JP | 2001-125122 | * | 11/2001 |
| JP | 2004-354961 | | 12/2004 |

OTHER PUBLICATIONS

First Office Action for corresponding Chinese Patent Application Serial No. 2006100837153, dated Oct. 12, 2007.
Office Action issued in corresponding Japanese Patent Application No. 2006-149298; issued Sep. 2, 2009.

\* cited by examiner

*Primary Examiner* — Lauren Nguyen
(74) *Attorney, Agent, or Firm* — Brinks Gilson & Lione (57) ABSTRACT

Provided is an LCD capable of compensating for a resistance variation in a link unit. The resistance variations in the gate lines, data lines and common lines are reduced to minimize the signal distortion in the LCD. Accordingly, it is possible to enhance the image quality characteristics of the LCD. The resistance variation can be reduced by adjusting the number or the size of contact holes in the link unit.

10 Claims, 11 Drawing Sheets

LIQUID CRYSTAL DISPLAY DEVICE CAPABLE OF COMPENSATNG FOR A RESISTANCE VARIATION IN A LINK UNIT

The present application claims the benefit of Korean Patent Application No. 2005-45916 filed in Korea on May 31, 2005, which is hereby incorporated by reference.

FIELD

The present invention relates to a liquid crystal display device (LCD), and more particularly, to an LCD capable of compensating for a resistance variation in a link unit.

BACKGROUND

A liquid crystal display device (LCD) has low power consumption and excellent portability and is spotlighted as the next generation high-tech display device.

The LCD is one of non-luminescent image display devices. The LCD includes a color filter substrate, an array substrate including thin film transistors (TFTs), and a liquid crystal layer formed by injecting liquid crystal into a space between the color filter substrate and the array substrate. The LCD displays an image using the difference in light reflectivity due to the anisotropy of the liquid crystal.

An active matrix LCD, in which TFTs and pixel electrodes are arranged in a matrix configuration, are widely used because it provides a good resolution and has an excellent capability of displaying a motion picture.

The LCD includes a liquid crystal panel on which liquid crystal cells are arranged in a matrix configuration, and driving circuits for driving the liquid crystal panel.

In the liquid crystal panel, gate lines are arranged to intersect data lines and the liquid crystal cells are formed in regions defined by the intersections.

In the liquid crystal panel, a common electrode and pixel electrodes are provided to supply an electric field to the respective liquid crystal cells. Each of the pixel electrodes is connected to one of the data lines through source/drain terminals of a TFT serving as a switching device.

A gate terminal of the switching TFT is connected to one of the gate lines that are configured to apply pixel voltage signals to the pixel electrodes on a line basis.

The driving circuit includes a gate driver for driving the gate lines, a data driver for driving the data lines, and a common voltage generator for driving the common electrode. The gate driver supplies a scanning signal (i.e., a gate signal) sequentially to the gate lines to drive the liquid crystal cells on the liquid crystal panel sequentially on a line basis. The data driver supplies a data voltage signal to each of the data lines every time when the gate signal is supplied to one of the gate lines. The common voltage generator supplies a common voltage signal to the common electrode.

In this way, the LCD displays an image by adjusting the light transmittance of each of the liquid crystal cells by the electric field that are applied between the pixel electrode and the common electrode in response to the data voltage signal.

The driving circuits are electrically connected to corresponding signal lines in a pixel region through electrode pads in the liquid crystal panel, to supply driving signals to the corresponding signal lines. The electrode pad is electrically connected through an electrode link to the corresponding signal line of the pixel region.

In the case of the above LCD, the number of pixels has increased for display of a high-resolution image and thus the widths of lines and the distances between the lines have decreased to a fine level.

Accordingly, the electrode link connected between the electrode pad and the corresponding signal line of the pixel region are positioned such that the gate lines have different lengths. Consequently, the gate lines have different resistances due to their different lengths.

Figure 1:
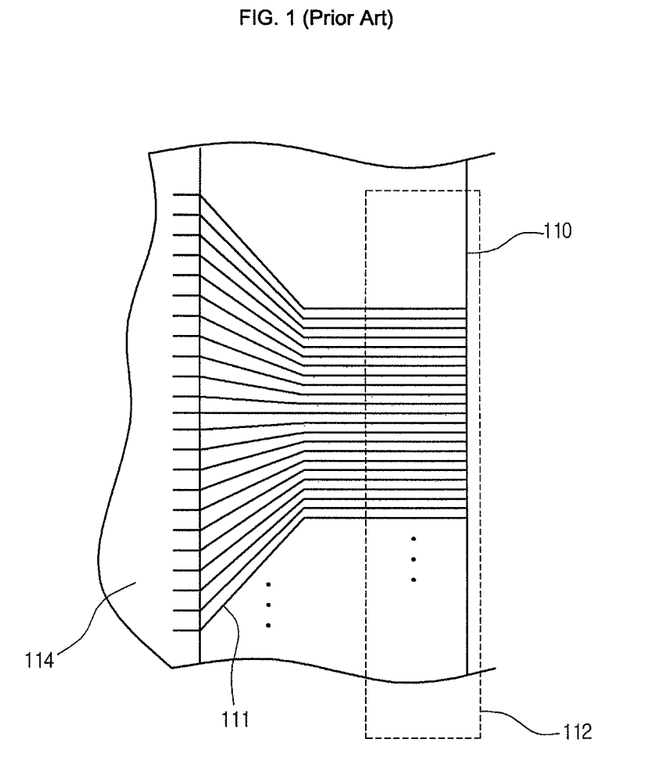
FIG. 1 is a schematic view of a gate line and a gate pad in a related art LCD.
Figure 2:
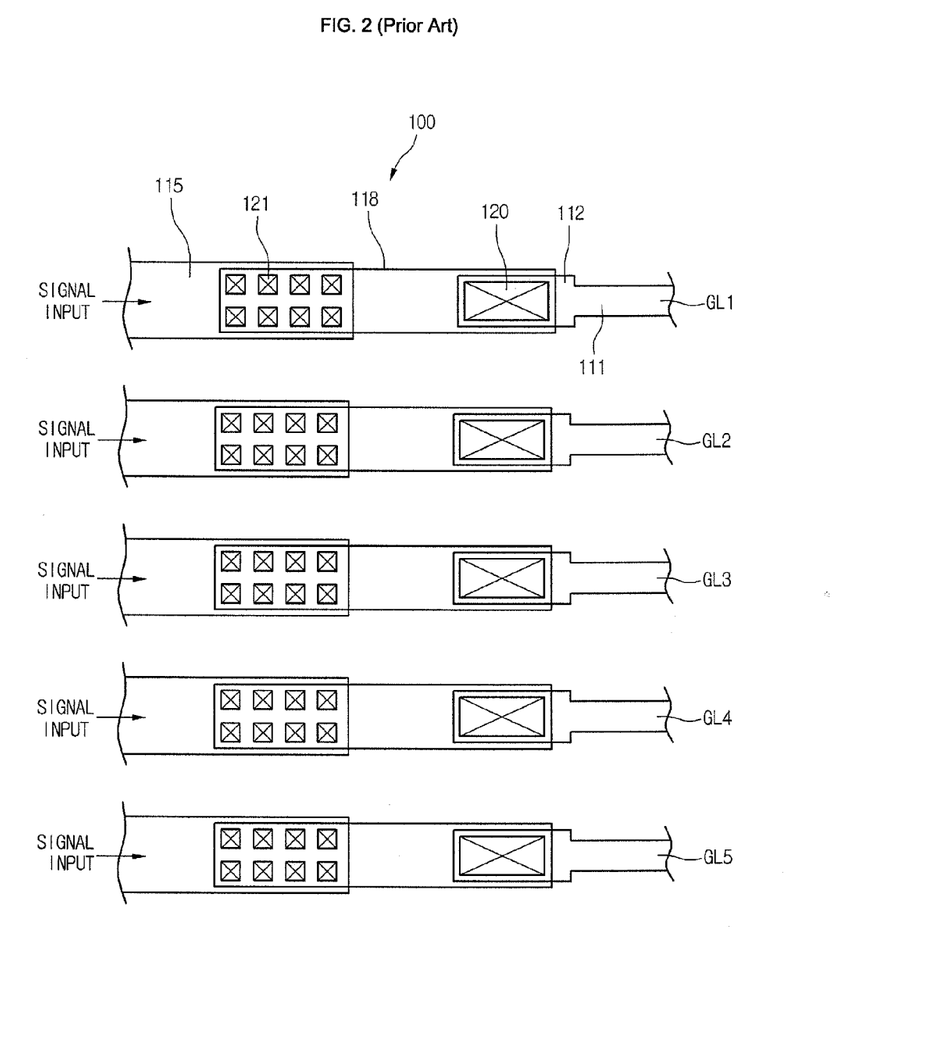
FIG. 2 is an expanded plan view of a gate pad and a link unit in the related art LCD of FIG. 1.

FIG. 1 is a schematic view of a gate line/pad in a related art LCD. FIG. 2 is an expanded plan view of a gate pad/link in the related art LCD of FIG. 1.

Referring to FIGS. 1 and 2, a gate pad 112 connected to a gate driver circuit (not illustrated) is formed in an edge region of a lower substrate 110.

The gate pad 112 receives a driving signal from a gate driver circuit line 115 and supplies the driving signal through a gate link 100 to a gate line (GL) 111 disposed in a pixel region 114.

The detailed structures of the gate pad 112 and the gate link 100 are illustrated in FIG. 2. The gate link 100 includes a gate line 111 formed on the lower substrate 110, a gate pad 112 connected to the gate line 111, a passivation layer (not illustrated) and a gate insulation layer (not illustrated) that are stacked on the lower substrate 110 (where the gate pad 112 is formed), in which gate pad hole 120 is formed to expose a pad region, and transparent electrode pattern 118 coated to contact the exposed gate pad 112.

The transparent electrode pattern 118 is connected to the gate driver circuit line 115 through a gate link hole 121 that is formed to penetrate the gate insulation layer and the passivation layer.

As illustrated in FIG. 2, gate lines 111 (GL1, GL2, GL3, GL4 and GL5) have different lengths according to their positions but have the same width and thickness.

Therefore, the gate lines 111 (GL1, GL2, GL3, GL4 and GL5) have different resistances due to their different lengths.

In particular, there is a large resistance difference between the longest and the shortest of the gate lines 111. Due to this resistance difference, different initial bias voltages are applied to the gate pads 112. Accordingly, gate signals applied to the gate lines of the pixel region 114 are distorted thereby degrading the image quality.

Also, when a driving signal is applied to the gate driver circuit lines 115, the corresponding resistances increase from a center region to an edge region.

Such a resistance difference also occurs in a data link that is connected between a data line of the pixel region and a data pad connected to a data driver circuit line.

This resistance difference due to a difference in the length of the data line also distorts a data signal applied to the data line of the pixel region, thereby degrading the image quality.

Also, when a driving signal is applied to data driver circuit lines, the corresponding resistances increase from a center region to an edge region.

In a related art in-plane-switching (IPS) LCD, when forming a common voltage applying unit in the outer region of an LCD panel, it is designed such that the number of contacts between a source electrode and a common electrode is identical to the number of contacts between a drain electrode and the common electrode. In this structure, a resistance component increases away from the center of the common voltage applying unit. This makes it impossible to uniformly maintain a common voltage in the LCD panel, thus degrading the image quality characteristics of the LCD panel.

SUMMARY

Accordingly, the present invention is directed to a liquid crystal display device (LCD) that substantially obviates one or more problems due to limitations and disadvantages of the related art.

An LCD includes a liquid crystal panel where signal lines in a display region are connected to corresponding circuit lines configured to supply signals to the corresponding signal lines, wherein the contact areas between the signal lines and the circuit lines are different in at least two signal lines.

In another aspect of the present invention, an LCD comprises a liquid crystal panel. The liquid crystal panel includes a link unit configured to connect gate lines of a display region to corresponding gate driver circuit lines configured to supply signals to the corresponding gate lines, wherein electrode patterns are formed to connect the gate lines to the corresponding gate driver circuit lines, and the contact holes between the gate lines and the corresponding electrode patterns or the contact holes between the gate driver circuit lines and the corresponding electrode patterns are set differently.

In a further another aspect of the present invention, an LCD comprises a liquid crystal panel. The liquid crystal panel includes a link unit configured to connect data lines of a display region to corresponding data driver circuit lines configured to supply signals to the corresponding data lines, wherein electrode patterns are formed to connect the data lines to the corresponding data driver circuit lines, and the contact holes between the data lines and the corresponding electrode patterns or the contact holes between the data driver circuit lines and the corresponding electrode patterns are set differently.

In a still further another aspect of the present invention, an LCD comprises a liquid crystal panel. The liquid crystal panel includes a link unit configured to connect common lines of a display region to corresponding common signal supply lines configured to supply signals to the corresponding common lines, wherein electrode patterns are formed to connect the common lines to the corresponding common signal supply lines, and the contact holes between the common lines and the corresponding electrode patterns or the contact holes between the common signal supply lines and the corresponding electrode patterns are set differently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
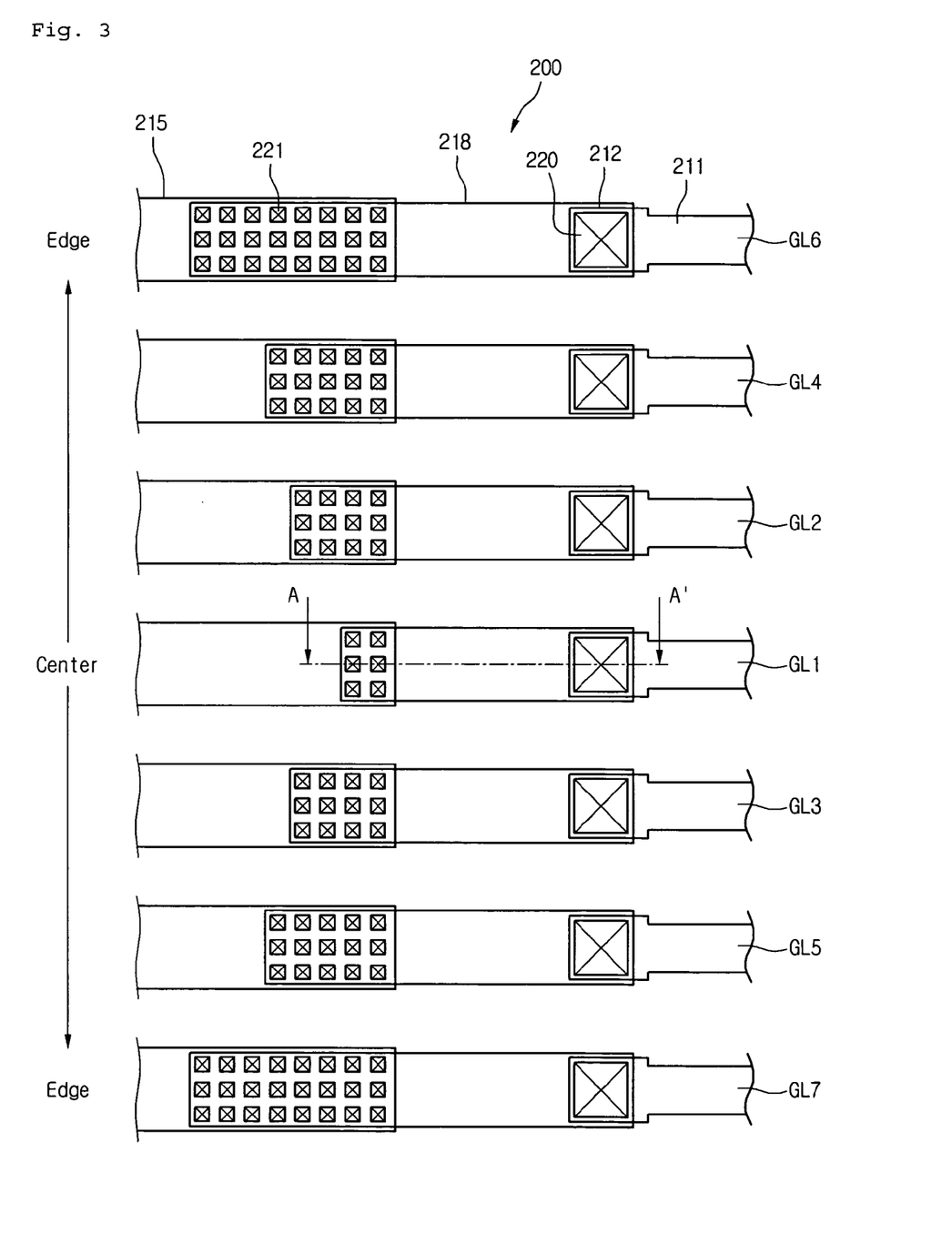
FIG. 3 is a plan view of an equiresistance gate link unit in an LCD according to a first embodiment of the present invention.
Figure 4:
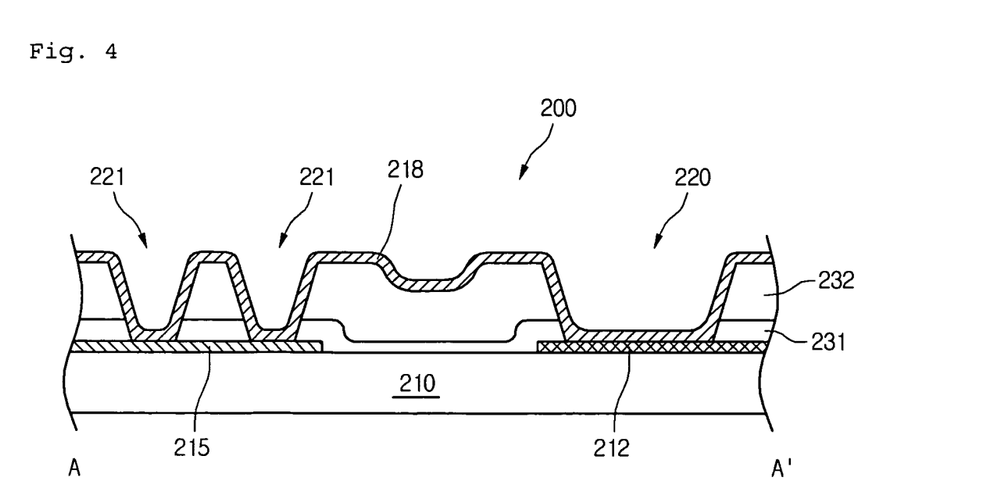
FIG. 4 is a sectional view taken along a line A-A' of FIG. 3.

FIG. 3 is a plan view of an equiresistance gate link unit 200 in an LCD according to a first embodiment of the present invention. FIG. 4 is a sectional view taken along a line A-A' of FIG. 3.

Referring to FIGS. 3 and 4, gate lines 211 (GL1, GL2, GL3, GL4, GL5, GL6 and GL7) are formed on a substrate 210. Gate pads 212 are formed to extend from the gate lines 211. Gate driver circuit lines 215 to which gate driving signals are applied are formed spaced apart from one another by a predetermined distance.

A gate insulation layer 231 and a passivation layer 232 are formed on the gate pads 212 and the gate driver circuit lines 215.

Gate pad contact holes 220 exposing the gate pads 212 and gate link contact holes 221 exposing portions of the gate driver circuit lines 215 are formed in the gate insulation layer 231 and the passivation layer 232.

Transparent electrode patterns 218 are formed on the passivation layer 232 to electrically connect the gate pads 212 and the gate driver circuit lines 215 through a front contact with the gate pad contact holes 220 and the gate link contact holes 221.

When driving signals are applied from the gate driver circuit lines 215 to center and edge regions, the resistances of the center and edge regions become different from one another. Therefore, in order to create an equiresistance, the contacts between the gate driver circuit lines 215 and the transparent electrode patterns 218 are formed to have different areas.

To this end, the number of the gate link contact holes 221 is set differently according to the positions of the gate driver circuit lines 215, thereby creating the equiresistance.

That is, the number of the gate link contact holes 221 for the gate driver circuit line 215 in the center region is set to the minimum. In other words, the number of the gate link contact holes 221 is set to increase toward the edge region, thereby minimizing the resistance variation.

Although not illustrated, the gate link unit 200 connecting the gate pads 212 and the gate driver circuit lines 215 are designed such that the lengths of the gate lines 211 are different according to their positions. Therefore, the gate lines 211 have a resistance variation due to their different lengths. Accordingly, the number of the gate pad contact holes 220 may be set differently to form an equiresistance.

At this time, the gate pads 212 connected to a gate driver circuit (not illustrated) are formed in the edge region of the substrate 210.

Figure 5:
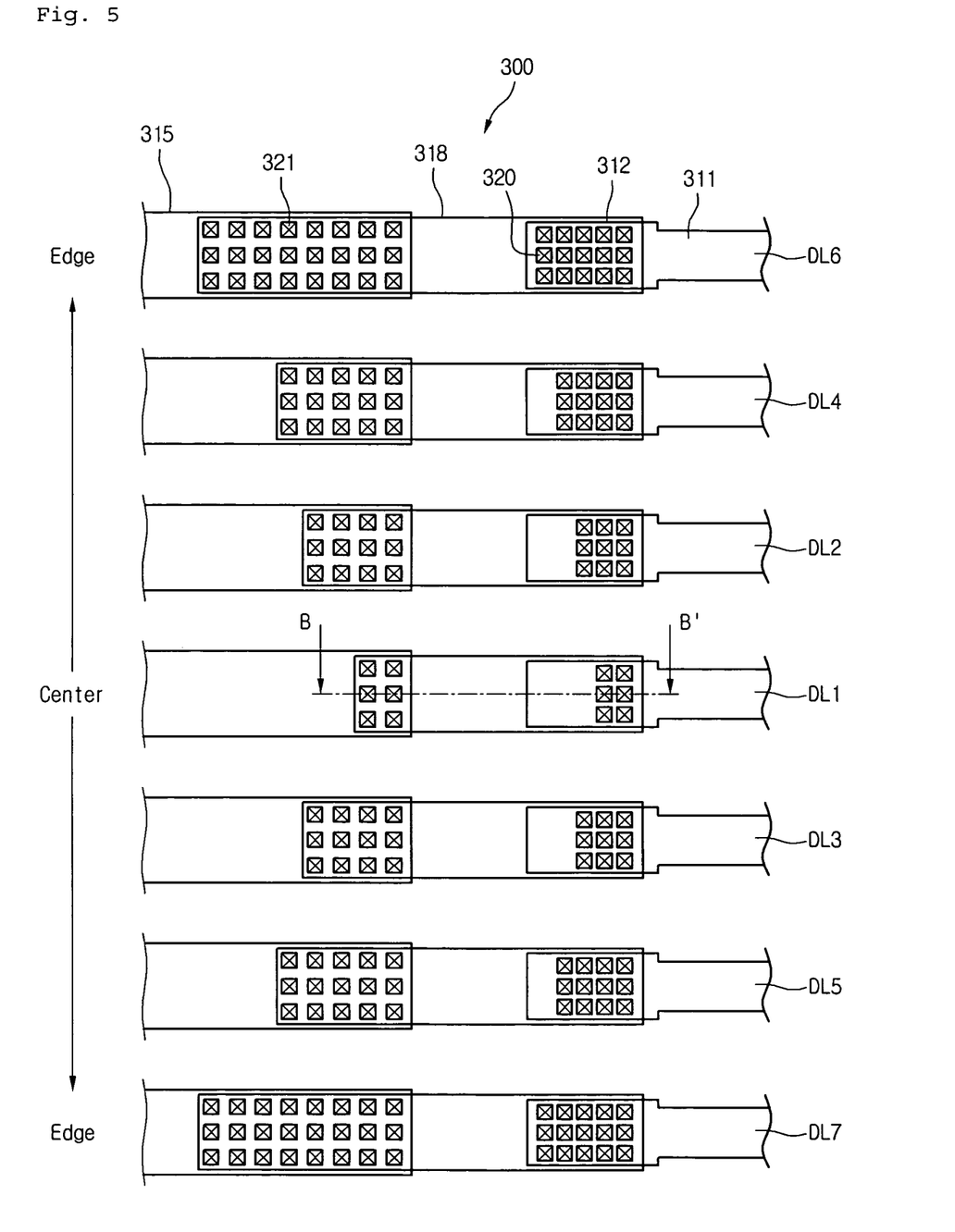
FIG. 5 is a plan view of an equiresistance data link unit of an LCD according to a second embodiment of the present invention.
Figure 6:
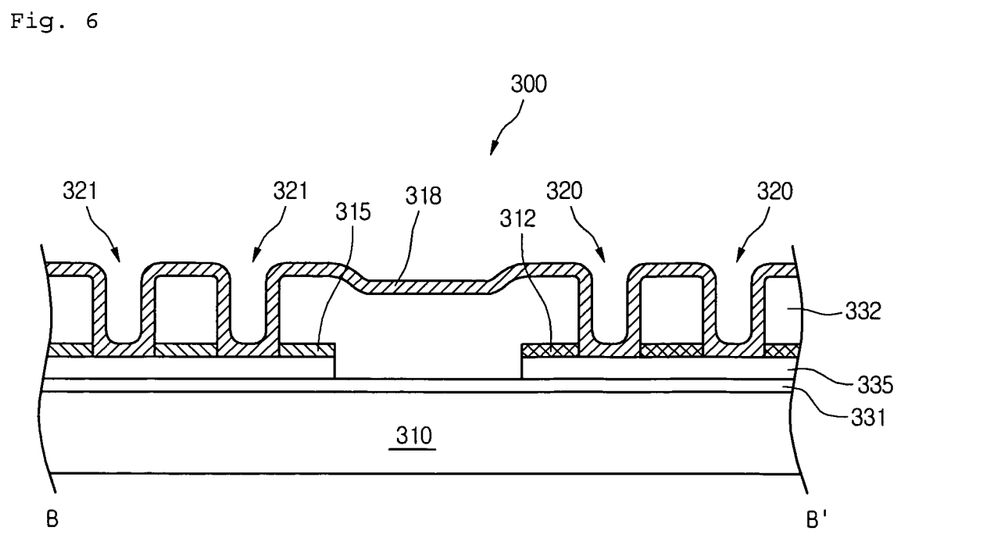
FIG. 6 is a sectional view taken along a line B-B' of FIG. 5.

FIG. 5 is a plan view of an equiresistance data link unit in an LCD according to a second embodiment of the present invention. FIG. 6 is a sectional view taken along a line B-B' of FIG. 5.

Referring to FIGS. 5 and 6, data lines 311 (DL1, DL2, DL3, DL4, DL5, DL6 and DL7) are formed on a substrate 310. Data pads 312 are formed to extend from the date lines 311. Date driver circuit lines 315 to which date driving signals are applied are formed spaced apart from one another by a predetermined distance.

Although not illustrated, gate patterns are formed on the substrate 310, and a gate insulation layer 331 is formed on the gate patterns.

Data lines 311 and data pads 312 are formed on the gate insulation layer 331, and active patterns 335 are formed beneath the data lines 311 and data pads 312.

A passivation layer 332 is formed on the data pads 312 and the data driver circuit lines 315.

Data pad contact holes 320 exposing the data pads 312 and the active patterns 335 and data link contact holes 321 exposing portions of the data driver circuit lines 315 and the active patterns 335 are formed in the passivation layer 332.

Transparent electrode patterns 318 are formed on the passivation layer 332 to electrically connect the data pads 312 and the data driver circuit lines 315 through a side contact with the data pad contact holes 320 and the data link contact holes 321.

When driving signals are applied from the data driver circuit lines 315 to center and edge regions, the resistances of the center and edge regions become different from one another. Therefore, in order to create an equiresistance, the contacts between the data driver circuit lines 315 and the transparent electrode patterns 318 are formed to have different areas.

To this end, the number of the data link contact holes 321 is set differently according to the positions of the data driver circuit lines 315, thereby creating the equiresistance.

That is, the number of the data link contact holes 321 for the data driver circuit line 315 in the center region is set to the minimum. In other words, the number of the data link contact holes 321 is set to increase toward the edge region, thereby minimizing the resistance variation.

Also, the data link unit 300 connecting the data pads 312 and the data driver circuit lines 315 are designed such that the lengths of the data lines 311 are different according to their positions. Therefore, the data lines 311 have a resistance variation due to their different lengths. Accordingly, the number of the data pad contact holes 320 may be set differently to form an equiresistance.

At this time, the data pads 312 connected to a data driver circuit (not illustrated) are formed in the edge region of the substrate 310.

Figure 7:
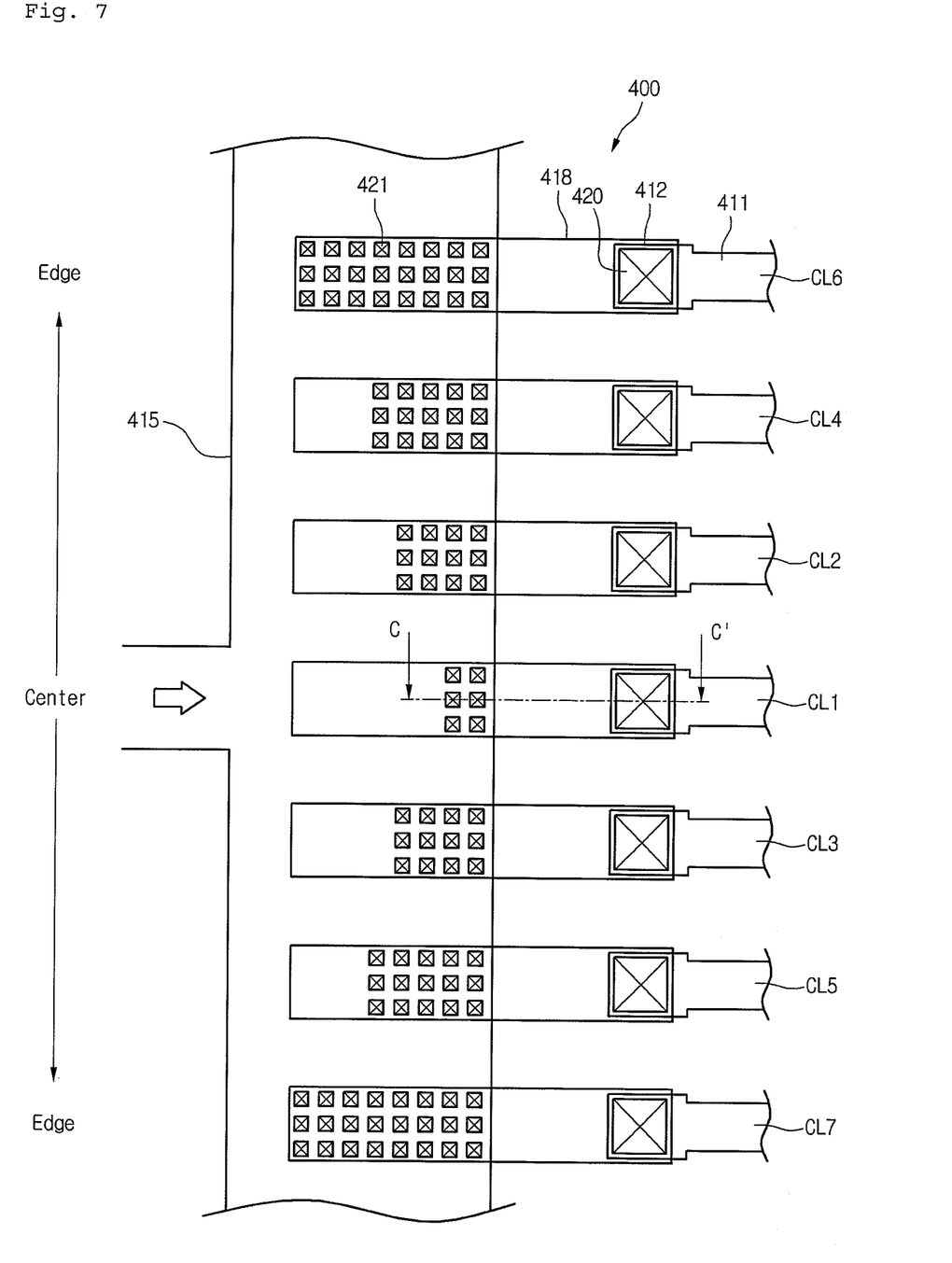
FIG. 7 is a plan view of an equiresistance common electrode link unit of an LCD according to a third embodiment of the present invention.
Figure 8:
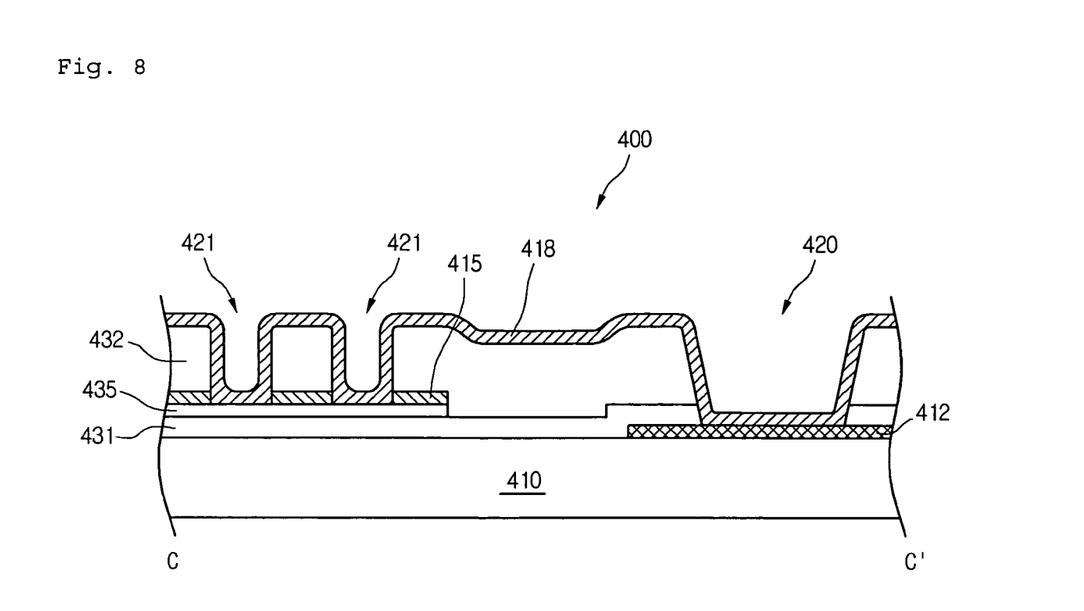
FIG. 8 is a sectional view taken along a line C-C' of FIG. 7.

FIG. 7 is a plan view of an equiresistance common electrode link unit in an LCD according to a third embodiment of the present invention. FIG. 8 is a sectional view taken along a line C-C' of FIG. 7.

In an IPS LCD, a common voltage applying unit is formed in an outer region of a liquid crystal panel, and a common electrode and a common line are formed in a lower substrate to apply a common voltage to the entire region of the liquid crystal panel.

At this time, the common voltage applying unit is electrically connected to the common electrode and the common line by transparent electrode patterns.

Referring to FIGS. 7 and 8, common lines 411 (CL1, CL2, CL3, CL4, CL5, CL6 and CL7) are formed on a substrate 410. Common pads 412 are formed to extend from the common lines 411. Common signal supply lines 415 to which common signals are applied are formed spaced apart from one another by a predetermined distance.

At this point, a gate insulation layer 431 is formed on the common lines 411, the common signal supply lines 415 are formed on the gate insulation layer 431, and active patterns 435 are formed beneath the common signal supply lines 415.

The common lines 411 are formed in a different direction than the common signal supply lines 415, and the common lines 411 are connected to the common signal supply lines 415.

A passivation layer 432 is formed on the common lines 411 and the common signal supply lines 415.

Common pad contact holes 420 exposing the common pads 412 and common link contact holes 421 exposing portions of the common signal supply lines 412 are formed in the passivation layer 432.

Transparent electrode patterns 418 are formed on the passivation layer 432 to electrically connect the data pads 312 and the data driver circuit lines 315 through a front contact with the common pad contact holes 420 and through a side contact with the common link contact holes 421.

When common signals are applied from the common signal supply lines 415 to center and edge regions, the resistances of the center and edge regions become different from one another. Therefore, in order to remove a resistance variation and create an equiresistance, the number of the common link contact holes 421 is set differently according to the positions of the common signal supply lines 415.

That is, the number of the common link contact holes 421 for the common signal supply line 415 in the center region is set to the minimum. In other words, the number of the common link contact holes 421 is set to increase toward the edge region, thereby minimizing the resistance variation.

Figure 9:
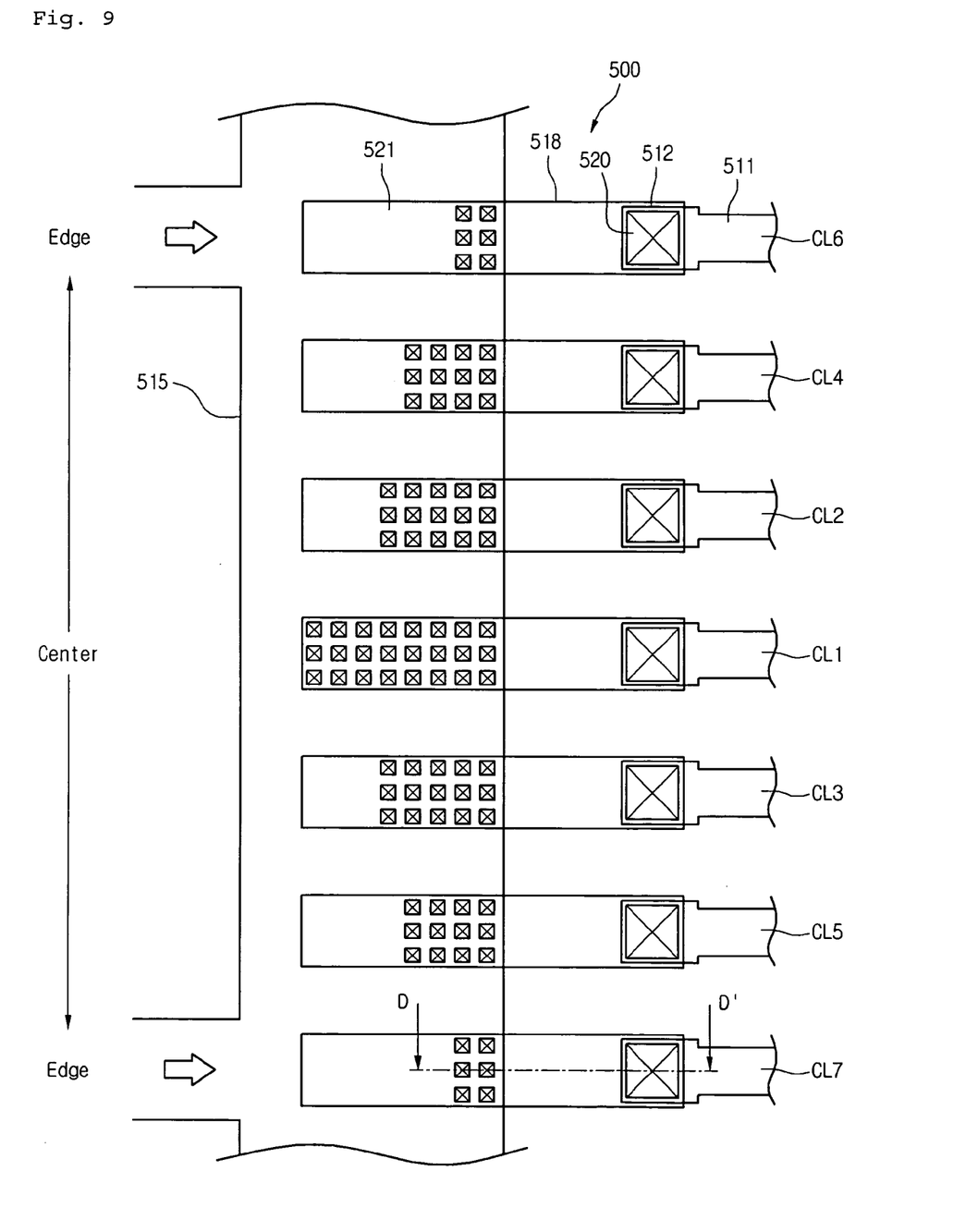
FIG. 9 is a plan view of an equiresistance common electrode link unit of an LCD according to a fourth embodiment of the present invention.
Figure 10:
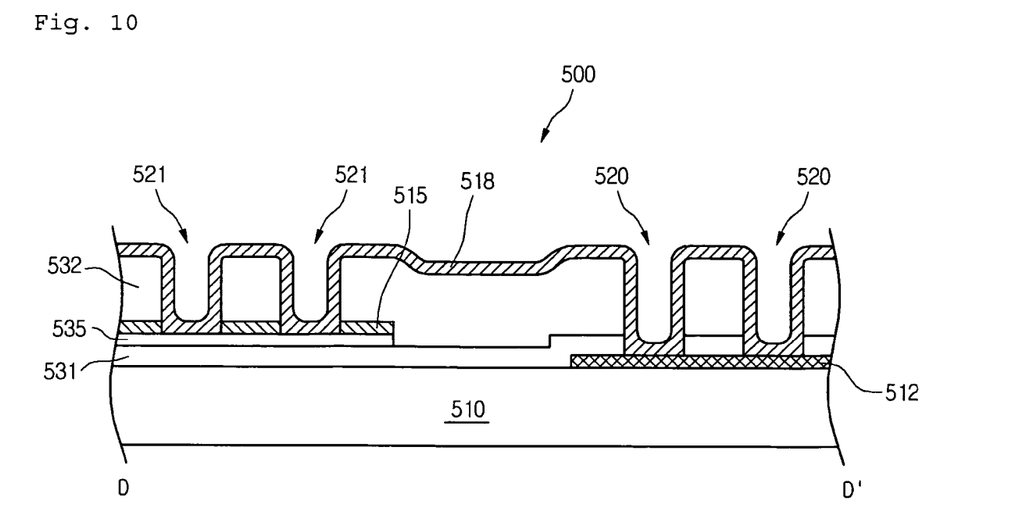
FIG. 10 is a sectional view taken along a line D-D' of FIG. 9.

FIG. 9 is a plan view of an equiresistance common electrode link unit in an LCD according to a fourth embodiment of the present invention. FIG. 10 is a sectional view taken along a line D-D' of FIG. 9.

In describing the present embodiment, the descriptions about the same parts as in the previous embodiment of FIGS. 7 and 8 are omitted for conciseness.

The number of common link contact holes 521 near common signal supply lines is set to the minimum. That is, the number of common link contact holes 521 is set to increase away from the signal applying position of the common signal supply lines 515, thereby minimizing the resistance variation.

A common electrode link unit 500 connecting common lines 511 (CL1~CL7) and transparent electrode patterns 518 are designed such that the lengths of the common lines 511 are different according to their positions. Therefore, the common lines 511 have a resistance variation due to their different lengths. Accordingly, the number of the common pad contact holes may be set differently to form an equiresistance.

Figure 11:
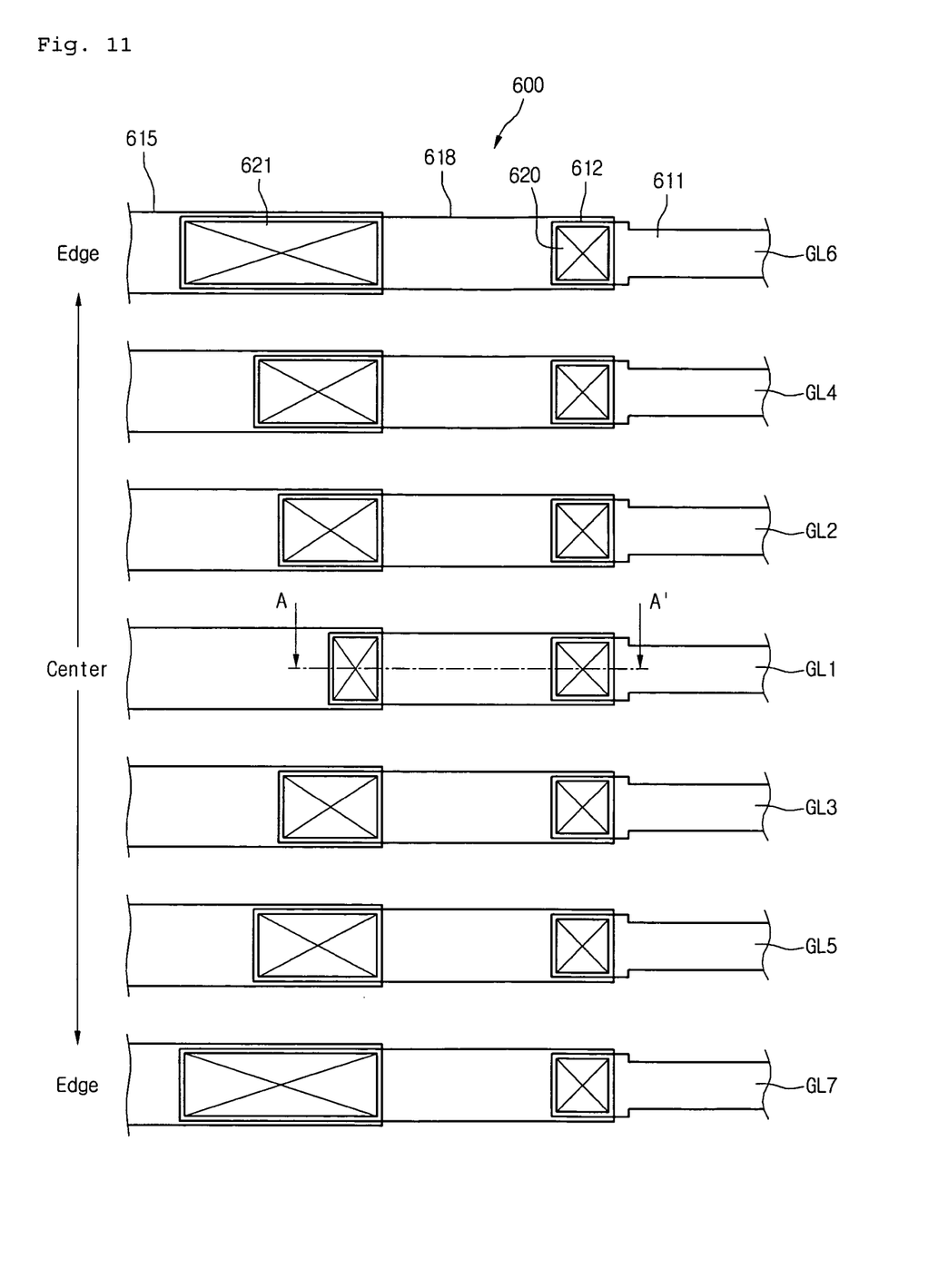
FIG. 11 is a plan view of an equiresistance gate link unit of an LCD according to a fifth embodiment of the present invention.

FIG. 11 is a plan view of an equiresistance gate link unit in an LCD according to a fifth embodiment of the present invention.

Referring to FIG. 11, gate lines 611 (GL1, GL2, GL3, GL4, GL5, GL6 and GL7) are formed on a substrate 610. Gate pads 612 are formed to extend from the gate lines 611. Gate driver circuit lines 615 to which gate driving signals are applied are formed spaced apart from one another by a predetermined distance.

Gate pad contact holes 620 are formed to expose the gate pads 612, and gate link contact holes 621 are formed to expose portions of the gate driver circuit lines 615.

Unlike the first embodiment of FIG. 3, the gate link contact hole 621 is formed in one piece. The size of a contact hole between each gate driver circuit line 615 and each transparent electrode pattern 618 increases from a center region to an edge region such that a contact resistance decreases from the center region to the edge region.

When driving signals are applied from the gate driver circuit lines 615 to the center and edge regions, the resistances of the center and edge regions become different from one another. Therefore, in order to create an equiresistance, the contacts between the gate driver circuit lines 615 and the transparent electrode patterns 618 are formed to have different areas.

To this end, the size of the gate link contact hole 621 is set differently according to the positions of the gate driver circuit lines 615, thereby creating the equiresistance.

That is, the size of the gate link contact hole 621 for the gate driver circuit line 615 in the center region is set to the minimum. In other words, the sizes of the gate link contact holes 621 are set to increase toward the edge region, thereby minimizing a resistance variation.

Also, the gate driver circuit lines 615 have a resistance variation due to their different lengths. Accordingly, the sizes of the gate link contact holes 621 may be set differently to form an equiresistance.

Also, contact holes 620 between the gate lines 611 and the transparent electrode patterns 618 may be set to be different from one another.

As above, the present invention sets the contact areas between the signal lines (e.g., gate lines) and circuit lines (e.g., gate driver circuit lines) to be different in at least two signal (or circuit) lines, thereby creating an equiresistance at contact points of the signal and data lines.

The fifth embodiment can be applied not only to the gate lines/the gate driver circuit lines, but also to the data lines/the data driver circuit lines and the common lines/the common signal supply lines.

The contact area may be adjusted by the size of the contact hole, or by the number of the contact holes.

The present invention adjusts the number or the size of the contact holes in the common signal supply lines and the transparent electrode patterns such that the common lines are formed to have an equiresistance, thereby making it possible to uniformly maintain a common voltage in the entire region of the liquid crystal panel and thus enhance the image quality characteristics of the liquid crystal panel.

Also, the contact area means an electrical connection area between the signal and circuit lines, not an area where the signal circuit lines contact the transparent electrode pattern. That is, the signal and circuit lines may directly contact each other without using the transparent electrode pattern.

As described above, the present invention can reduce the resistance variations in the gate lines, the data lines and the common lines to reduce the signal distortion in the LCD. Accordingly, it is possible to enhance the image quality characteristics of the LCD.

Also, the present invention can simply reduce the resistance variation by adjusting the number or the size of the contact holes in the link unit. Accordingly, it is possible to provide the reduced degree of design freedom, the reduced process, the increased distance between lines, the reduced rubbing failure, the reduced pattern failure, and the increased production yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a plurality of gate pads and a plurality of gate driver circuit lines arranged in a first direction and contacted with a substrate, the gate pad being physically spaced apart from and being electrically isolated from the gate driver circuit line;
   a gate insulating layer on the gate pads and the gate driver circuit lines;
   a passivation layer on the gate insulating layer;
   a first contact hole passing through the gate insulating layer and the passivation layer to expose a portion of each of the gate pads;
   a plurality of second contact holes passing through the gate insulating layer and the passivation layer to expose a portion of each of the gate driver circuit lines;
   a plurality of transparent electrode patterns on the passivation layer, wherein the transparent electrode pattern is disposed on top of the gate pad and the gate driver line to facilitate an electrical connection between the gate pad and the gate driver circuit line,
   wherein the transparent electrode pattern is electrically connected to the gate driver circuit line through the plurality of second contact holes,
   wherein the transparent electrode pattern has a bottom surface that directly contacts a top surface of the passivation layer between the plurality of second contact holes of the passivation layer,
   wherein the number of the second contact holes on the gate driver circuit lines increase as it goes from the gate driver circuit lines at a center region to the gate driver circuit lines at the edge region according to a second direction perpendicular to the first direction,
   wherein the plurality of transparent electrode patterns have different length according to the first direction, and
   wherein overlapping areas between the plurality of transparent electrode patterns and the plurality of gate driver circuit lines are different.

2. The liquid crystal display device according to claim 1, wherein the second contact holes pass through the passivation layer and the gate insulating layer.

3. The liquid crystal display device according to claim 1, wherein length of the transparent electrode patterns lengthen as it goes from the gate driver circuit lines at a center region to the gate driver circuit lines at the edge region according to the second direction.

4. The liquid crystal display device according to claim 1, wherein the first contact holes of the gate pads have the same size.

5. The liquid crystal display device according to claim 1, wherein areas overlapped between the transparent electrode patterns and the gate driver circuit lines enlarge as it goes from the gate driver circuit lines at a center region to the gate driver circuit lines at the edge region according to the second direction.

6. The liquid crystal display device according to claim 1, wherein the first contact hole is positioned at a first end portion of the transparent electrode pattern and the second contact holes are positioned at a second end portion of the transparent electrode pattern.

7. The liquid crystal display device according to claim 6, wherein the first end portion of the transparent electrode pattern overlaps the end portion of the gate pad and the second end portion of the transparent electrode pattern overlaps the end portion of the gate driver circuit line.

8. The liquid crystal device according to claim 1, further comprising:
   and configured to generate the gate signals
   wherein gate signals of the gate driver circuit are supplied to the gate pads via the gate driver circuit lines and the transparent electrode patterns.

9. The liquid crystal display device according to claim 1, wherein gate signals from the plurality of gate driver circuit lines are supplied to the plurality of gate pads.

10. The liquid crystal display device according to claim 1, wherein the plurality of second contact holes on all of the plurality of gate driver circuit lines substantially have the same depth.

* * * * *